United States Patent [19]

Fukushima

[11] Patent Number: 4,894,946
[45] Date of Patent: Jan. 23, 1990

[54] OTTER BOARD

[75] Inventor: Tsutomu Fukushima, Shimonoseki, Japan

[73] Assignee: Nichimo Co., Ltd., Tokyo, Japan

[21] Appl. No.: 239,543

[22] Filed: Sep. 1, 1988

[30] Foreign Application Priority Data

Feb. 8, 1988 [JP] Japan .................................. 63-15337

[51] Int. Cl.⁴ ................................................ A01K 91/00
[52] U.S. Cl. ...................................... 43/43.13; 43/9.7
[58] Field of Search ................. 43/43.13, 43.12, 42.13, 43/9, 9.4, 9.5, 9.7

[56] References Cited

U.S. PATENT DOCUMENTS

| 2,062,718 | 12/1936 | Kallberg | 43/43.13 |
| 2,825,994 | 3/1958 | Bruhn | 43/43.13 |
| 2,923,085 | 2/1960 | Dahl | 43/43.13 |
| 2,942,371 | 6/1960 | Johnson et al. | 43/43.13 |
| 3,044,208 | 7/1962 | Minera | 43/43.13 |
| 3,153,298 | 10/1964 | Lemon | 43/43.13 |
| 3,230,660 | 1/1966 | Meyers | 43/43.13 |
| 3,470,649 | 10/1969 | Cole | 43/43.13 |
| 4,703,580 | 11/1987 | Kammeraad | 43/43.13 |
| 4,745,702 | 5/1988 | Koch | 43/43.13 |

Primary Examiner—M. Jordan

[57] ABSTRACT

An otter board comprising a front board member and rear board member. The rear board member is connected to the front board member through variable connecting mechanism, so that the relative positions of both the front and rear board members may be freely adjusted.

24 Claims, 2 Drawing Sheets ic
OTTER BOARD

FIELD OF THE INVENTION

The present invention relates to otter boards, which are often referred to as otter doors or trawl doors, for use in a trawl fishery, and particularly, to such otter boards comprising a front board member and a rear board member.

BACKGROUND OF THE INVENTION

In general, the otter boards are used to open the mouth of a trawl net in a trawling operation. There are conventionally known otter boards of various types such as a single-plate and multi-plate types, but it is necessary to adjust the spreading force depending upon the fishery purpose. To adjust the spreading force of the otter boards, it is a conventional practice to change the angle of elevation of the otter boards with respect to a towing direction, or to change the area of an otter board body.

If the angle of elevation of the otter board is changed, however, the stability of opening the mouth of the net is degraded and hence, this method has conventionally been less used. In addition, to change the area of the otter boards, it is normally necessary to provide a vessel with otter boards of several types having different areas, resulting in an increased cost and a long time required for replacement of the otter boards, with a danger attendant on the replacing operation. Particularly, in multi-plate type otter boards disclosed in Japanese Patent Application Laid-open No. 99881/74 and Japanese Utility Model Application Laid-open No. 106458/85, individual plates of the otter boards are secured together, resulting in an increased occupying space. Further, the above disadvantage is more serious.

Thereupon, for overcoming these problems, proposals, for example, as disclosed in Japanese Patent Publication Nos. 16858/76 and 42711/77 have been made.

In these proposals, drainage channels or slits are made through a thicker otter board, so that changing of the area of the opened channels or slits by the operation of an on-off valve or an otter flap causes the amount of water entering the individual channels or slits to be adjusted, thereby adjusting the spreading force of the otter board.

In these methods, however, the amount of spreading force is less changed and hence, it is difficult to adjust the spreading force in a wider range, because the opened area of the individual channel or slit in the inner surface of the otter board is fixed, and the on-off valve or flap is provided for adjusting the amount of water flowing into deeper portion of each channel or slit.

BRIEF SUMMARY OF THE INVENTION

The present invention has been accomplished with the foregoing in view, and it is an object of the present invention to provide an otter board of a simple construction wherein the spreading force can be adjusted in a wider range, and the mouth of a trawl net can be opened depending upon the fishery purpose.

To attain the above object, according to the present invention, there is provided an otter board comprising a front board member and rear board member, wherein the rear board member is connected to the front board member through variable connecting mechanism for freely adjusting the relative positions of both the front and rear board members.

With the above construction, the spreading force of the otter board can be freely adjusted by changing the condition of the front and rear board members connected through variable connecting mechanisms to adjust the relative positions of the front and rear board members.

The above and other objects, features and advantages of the invention will become apparent from reading of the following description of the preferred embodiments, taken in conjunction with the accompanying drawings.

DETAILED DESCRIPTION OF THE PREFERRED EMBODIMENT

One embodiment of the present invention will now be described with reference to the accompanying drawings.

Figure 1:
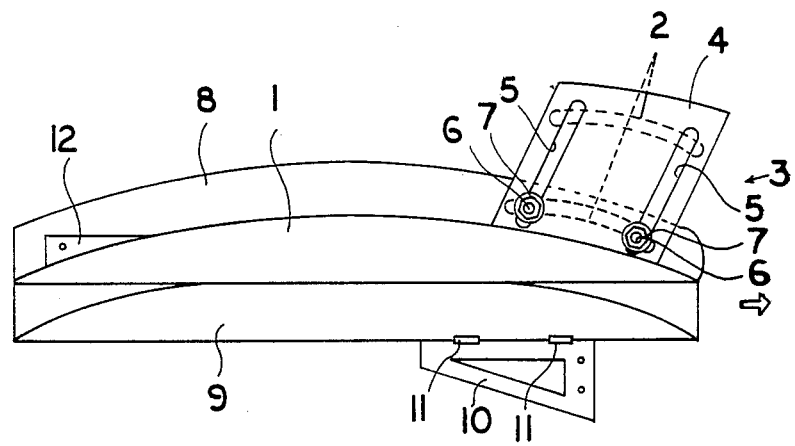
FIG. 1 is a plan view of an otter board according to one embodiment of the present invention.

Referring to FIG. 1 to 5, there is shown an otter board comprising a front board member 1 and rear board member 2. Each of these members is inwardly bent at its vertically central portion into a substantially <-shaped form and curved to have an outwardly swelled horizontal section. The rear board member 2 is connected to a back side of the front board member 1 through upper and lower variable connecting mechanisms 3, so that the relative positions of the members are variable. The variable connecting mechanism 3 comprises a substantially parallelogrammatic guide plate 4 projecting from the back of the front board member 1. Bolts 6 built in upper and lower ends of the rear board member 2 are passed through parallel guide grooves 5 made in the guide plate 4, respectively, and nuts 7 are tightened to the bolts 6, whereby the rear board member 2 is secured to the front board member 1. The parallel guide grooves 5 made in the guide plate 4 are provided to be inclined forwardly with respect to the longitudinal direction of the front board member 1 (a direction from the right to the left as viewed in FIG. 1), as shown in FIG. 1, so that the rear board member 2 may be moved obliquely and forwardly along the guide groove 5 in a two-dimensional space, while concurrently varying both of the spacing and offsetting directions relative to the front board member 1. It should be noted that a step member 8 is secured to the lower end of the front board member 1 and has a leading end curved upwardly. In addition, a central plate 9 is secured to an inner side of the bent portion at the vertically central portion of the front board member 1, and a warp bracket 10 for connecting an otter board-towing warp is attached to the central plate 9 through hinge members 11. A bracket 12 for connecting a trawl net is also mounted projectingly on a rear and outer surface of the front board member 1 at each of its upper and lower ends.

Description will be made of the operation of this embodiment.

Figure 2:
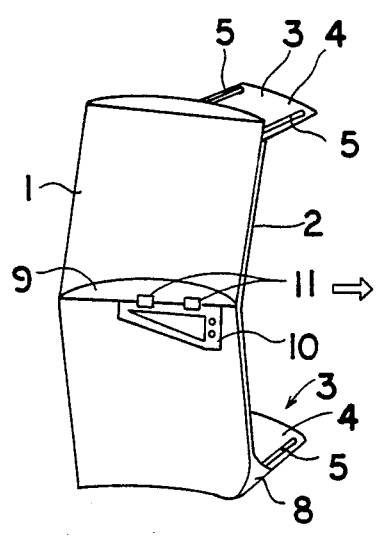
FIGS. 2 and 3 are perspective views illustrating the inner surface and back sides of front and rear board members in close contact with each other.
Figure 3:
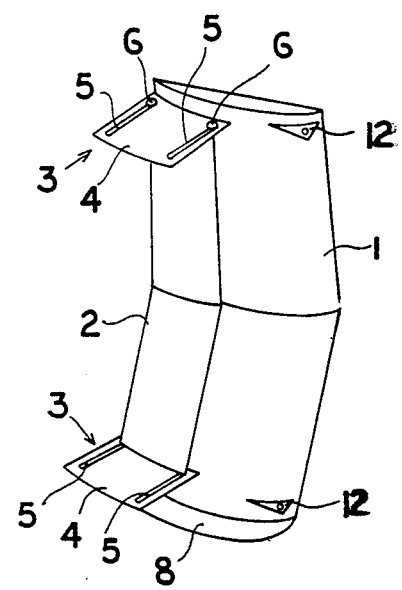

With the rear board member 2 brought into close contact with the back of the front board member 1, as shown in FIGS. 1 to 3, a portion in contact with a water current is only the inner surface of the front board member 1 when the otter boards are being towed in a direction of a bold arrow in FIGS. 1 and 2.

Figure 4:
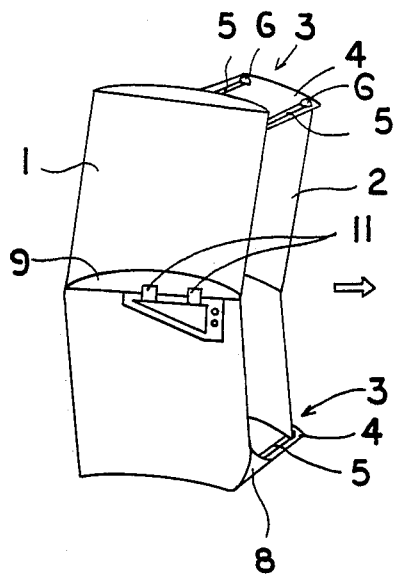
FIGS. 4 and 5 are views, similar to FIGS. 2 and 3, but with the front and rear board members separated from each other.
Figure 5:
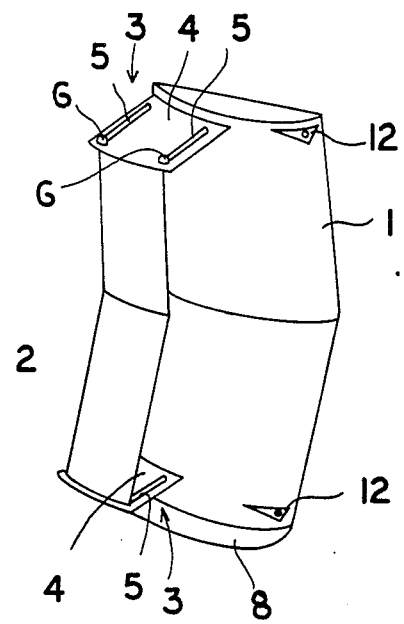

On the other hand, when the rear board member 2 is separated from the front board member 1, as shown in FIGS. 4 and 5, the water current also strikes the inner surface of the rear board member 2, resulting in an increased area available for the otter board.

In general, it is known that the spreading force of the otter board increases in proportion to the area of the otter board.

Therefore, with the otter board according to the present invention, the spreading force thereof can be freely adjusted and set depending upon the fishery purpose by adjusting the relative positions of the front board member 1 and the rear board member 2 through the variable connecting mechanism 3 to vary the area available for the otter board.

In addition, if the area of the rear board member 2 is about 40% of that of the front board member 1, for example, the spreading force for the otter board can be freely adjusted in a range of from a minimum level with both the board members 1 and 2 in close contact with each other to a level about 40% larger than the minimum level.

In containing the otter board of this embodiment, both the board members 1 and 2 may be brought into close contact with each other as shown in FIGS. 1 to 3 and if doing so, the occupying space is reduced, which is convenient for containment.

Alternatively, the configuration and the size of the board members 1 and 2 may be properly varied depending upon the fishery purpose, and the disposition of the rear board member 2 relative to the front board member 1 may be inside the front board member. Further, the relative position of the rear board member 2 to the front board member 1 may be varied in a one-, two- or three-dimensionally space by utilizing the known variable connecting mechanisms in combination.

It is to be understood that the present invention is not limited to the above embodiments, but it is intended to include many modifications and variations within the scope of the present invention.

What is claimed is:

1. An otter board comprising a front board member and rear board member, wherein the rear board member is connected to the front board member through variable connecting mechanism which permits free adjustment of the relative positions of both the front and rear board members so that they may be brought into and fixed in positions to exhibit a proper net spreading force.

2. An otter board according to claim 1, wherein said rear board member is positioned at the back side of said front board member.

3. An otter board according to claim 1, wherein the relative positions of the front and rear board members are variable in spacing and offsetting directions.

4. An otter board useful in trawling operations to exert force to spread a net connected to said otter board such that when two otter boards are connected to a mouth of the net and the boards and net are towed through the water, the otter boards tend to move away from each other and laterally with respect to a towing direction, comprising:

(a) a front board having an inner side contacting a water current resulting from said towing and a backside not contacting said current, said front board being bent about its vertically central portion so that said backside forms an obtuse angle about said vertically central portion and said front board having a curved horizontal cross section such that said inner side is concave;

(b) a rear board having an inner side facing the backside of said front board and a backside facing away from said front board, said rear board being bent about its vertically central portion so that said rear board backside forms an obtuse angle about its vertically central portion, said rear board having a curved horizontal cross section such that said rear board inner side is concave, and said rear board inner side being shaped so that it may be brought into substantial facing contact with the front board backside and out of contact with said water current;

(c) a horizontal plate attached to the inner side of said front board at its vertically central portion, said plate having a curved edge that fits against the curve of said front board horizontal cross section and a straight edge opposite said curved edge, said straight edge contacting both vertical edges of the front board;

(d) a warp bracket hingedly attached to said horizontal plate for the attachment of an otter board towing warp, said bracket being pivotable about said straight edge.

(e) two brackets for connecting a trawling net mounted on the backside of the front board at upper and lower edges of said front board backside;

(f) said brackets being located about the horizontal center of the front board to cause the front board inner side to be maintained at an oblique angle with respect to the water current when a net is towed;

(g) a connecting mechanism for adjustably setting the amount of rear board inner side surface area contacted by said water current, comprising;
  i. two substantially parallelogrammatic guide plates located near upper and lower edges of the front board backside, each plate having a pair of parallel guide grooves running away from the front board backside;
  ii. bolts built into upper and lower ends of the rear board, said bolts passing through said guide grooves;
  iii. nuts which can be tightened on said bolts to secure the rear board at a desired position with respect to the front board and the water current to expose a desired amount of rear board inner side surface area to contact with the water current to achieve a desired net spreading force in combination with the front board inner side surface area on towing of the otter board.

5. An otter board useful in trawling operations to exert force to spread a net connected to said otter board such that when two otter boards are connected to the mouth of the net and the boards and net are towed through the water, the otter boards tend to move away from each other and laterally with respect to a towing direction, comprising:

(a) a front board having an inner side contacting a water current resulting from said towing and a backside not contacting said current;

(b) a rear board having an inner side facing the backside of the front board and a backside facing away from the front board;

(c) a mechanism connecting the rear board to the backside of the front board which mechanism permits setting the relative positions of the front and rear boards to expose a desired portion of the rear board inner side surface area to contact with the water current to achieve a desired net spreading force in combination with the front inner side surface area, upon towing of the otter board.

6. The otter board of claim 5 wherein said front board is bent about its vertically central portion so that said backside forms an obtuse angle about said vertically central portion and said front board has a curved horizontal cross section such that said inner side is concave.

7. The otter board of claim 6 wherein said rear board is bent about its vertically central portion so that said rear board backside forms an obtuse angle about its vertically central portion, said rear board has a curved horizontal cross section such that said rear board inner side is concave, and said rear board inner side is shaped so that it may be brought into substantial facing contact with the front board backside and out of contact with said water current.

8. The otter board of claim 5 wherein the connecting mechanism comprises two substantially parallelogrammatic guide plates projecting from the back side of the front board.

9. The otter board of claim 8 wherein each guide plate contains a pair of parallel guide grooves.

10. The otter board of claim 9 wherein upper and lower ends of the rear board contain bolts which pass through said guide grooves.

11. The otter board of claim 10 comprising nuts which can be tightened on said bolts to secure said rear board to said front board.

12. The otter board of claim 9 wherein the guide grooves are inclined forwardly with respect to the longitudinal direction of the front board member so that said rear board may be moved obliquely and forwardly along said guide grooves in a two dimensional space while concurrently varying both the spacing and offsetting direction of the rear board relative to the front board.

13. The otter board of claim 5 comprising a step member secured to the lower end the front board, said step member having an upwardly curved leading end.

14. The otter board of claim 7 comprising a horizontal plate attached to the inner side of said front board at its vertically central portion, said plate having a curved edge that fits against the curve of said front board horizontal cross section and a straight edge opposite said curved edge, said straight edge contacting both vertical edge of the front board.

15. The otter board of claim 14 comprising a warp bracket hingedly attached to said horizontal plate for the attachment of an otter board towing warp, said bracket being pivotable about said straight edge.

16. The otter board of claim 15 comprising two brackets for connecting a trawling net, mounted on the backside of the front board at upper and lower edges of said front board backside.

17. The otter board of claim 16 wherein said brackets are located about the horizontal center of the front board to cause the front board inner side to the maintained at an oblique angle with respect to the water current when a net is towed.

18. The otter board of claim 5 wherein the rear board has a surface area of about 40% of the front board area.

19. The otter board of claim 5 wherein the front and rear boards may be brought into substantial facing contact with each other to minimize the spreading force.

20. The otter board of claim 19 wherein water current strikes only an inner side of the front board when the otter board is towed.

21. An otter board for exerting lateral force on a net dragged by said otter board when towed through water, comprising:
  a. a longitudinally and vertically elongated front board having respective concave and convex transversely facing surfaces;
  b. means for applying a rotational couple to said front board about a vertical axis as said front board is towed through water, comprising:
    i. means for attaching a tow rope to said front board at a position transversely displaced, in the direction of said concave transversely facing surface, and longitudinally displaced in a first direction from said board vertical axis so that when said front board is pulled through water by a tow rope attached to said means for attachment thereof first longitudinal force is applied to said front board along a line offset from said vertical axis;
    ii. means for attaching a net pulling rope to said front board at a position transversely displaced, in the direction of said convex transversely facing surface, and longitudinally displaced in a direction opposite said first direction from said front board vertical axis so that when said net is pulled through the water by a net pulling rope attached to said means for attachment thereof second longitudinal force is applied to said front board along a line offset from said vertical axis in a transverse direction opposite that of offset of said first longitudinal force, causing said concave surface of said front board to encounter an effective water current resulting from said towing;
  forces applied to said otter board by said respective ropes producing a couple tending to rotate said front board about said vertical axis, causing said concave surface of said front board to encounter on effective water current resulting from said towing;
  c. a longitudinally and vertically elongated rear board having respective concave and convex transversely facing surfaces essentially parallel with corresponding concave and convex surfaces of said first board, said rear board being longitudinally less elongated than said first board;
  d. means connecting said rear board to said front board for adjustably fixing the portion, if any, of said rear board exposed to effective water current in the direction of towing when said otter board is towed.

22. An otter board for exerting lateral force of adjustable magnitude on a net dragged by said otter board when towed through water, comprising:
  a. a longitudinally and vertically elongated first board;
  b. means for applying a rotational couple to said board about a vertical axis as said board is towed, comprising:

i. means for attaching a tow rope to said first board at a position transversely and longitudinally displaced from said vertical axis;
ii. means for attaching a net pulling rope to said first board at a position transversely and longitudinally displaced from said vertical axis in directions opposite those of said tow rope attachment means;

so that when said first board is towed by a rope attached to said means for attachment thereof and a net is dragged by a rope attached to said means for attachment thereof, forces applied in opposite longitudinal directions by said two rope and said net rope are transversely displaced from a vertical axis of said first board, causing said board to rotate about said vertical axis and present a projected area, in the towing direction, less than actual transversely facing surface area of said first board;

c. a second board longitudinally less elongated than said first board;
d. means connecting said second board to said first board for adjustably fixing second board projected area in the towing direction extending beyond first board projected area in the towing direction to adjustably fix magnitude of lateral force applied to said net.

23. The otter board of claim 21 wherein:
e. said front is bent about its vertically central portion so that said convex surface forms an obtuse angle about said vertically central portion;
f. said rear board is bent about its vertically central portion so that said rear board convex surface an obtuse angle about its vertically central portion;
g. the connecting means comprise two substantially parallelogrammatic guide plates projecting from the convex surface of the front board and each guide plate contains a pair of parallel guide grooves;
h. upper and lower ends of the rear board contain bolts which pass through said guide grooves;
i. The otter board further comprises nuts which can be tightened on said bolts to secure said rear board to said front board;
j. the guide grooves are inclined forwardly with respect to the longitudinal direction of the front board member so that said rear board may be moved obliquely and forwardly along said guide grooves in a two dimensional space while concurrently varying both the spacing and offsetting direction of the rear board relative to the front board;
k. the otter board comprises a step member secured to the lower end of the front board, said step member having an upwardly curved leading end;
l. the otter board comprises a horizontal plate attached to the concave surface of said front board at its vertically central portion, said plate having a curved edge that fits against said front board concave surface and a straight edge contacting both vertical edges of the front board;
m. said means for attaching a tow rope comprise a warp bracket hingedly attached to said horizontal plate for the attachment of an otter board towing warp, said bracket being pivotable about said straight edge;
n. said means for attaching a net pulling rope comprise two brackets for connecting a trawling net, mounted on the convex surface the front board at upper and lower edges of said front board.

24. The otter board of claim 23 wherein said means connecting said second board to said first board comprise:
e. two substantially parallelogrammatic guide plates projecting from the first board wherein
i. each guide plate contains a pair of a parallel guide grooves; and
ii. the guide grooves are inclined forwardly with respect to the longitudinal direction of the first board so that said second board may be moved obliquely and forwardly along said guide grooves in a two dimensional space while concurrently varying both the spacing and offsetting direction of the second board relative to the first board;
f. means for securing said second board along said guide grooves.

* * * * *